United States Patent Office.

JOHN H. MESLER, OF SYMMES CORNER, OHIO.

Letters Patent No. 65,256, dated May 28, 1867.

IMPROVED COMPOUND FOR CURE OF HOG-CHOLERA.

*The Schedule referred to in these Letters Patent and making part of the same.*

TO WHOM IT MAY CONCERN:

Be it known that I, JOHN H. MESLER, of Symmes Corner, in the county of Butler, and State of Ohio, have invented a new and useful Compound for the Prevention and Cure of "Hog-Cholera;" and I do hereby declare the following to be a full, clear, and exact description of the same, with its mode of compounding and manner of administering.

The object of this invention is the prevention and cure of a very prevalent and dangerous malady among hogs, commonly known by the name of "hog-cholera," the said medicine having proved very effective in curing cases of the above disease.

My manner of compounding is as follows: Put three quarts of chamber-lye into a jug; add to the same twelve ounces gum assafœtida; let stand seven days; then add, tincture camphor, two ounces; tincture opium, two ounces; tincture rhubarb, two ounces; whiskey, one and one-half pint.

After thoroughly mixing the compound it is ready for administering, which is done as follows:

For the prevention of the disease: Give one-half table-spoonful three times per week to each hog.

For the cure of the disease: Give one-half table-spoonful three times per day to each hog.

The medicine to be administered in milk or slop, or, in extreme cases, to be poured down the throat of the animal.

I claim herein as new, and of my invention—

A compound for the prevention and cure of hog-cholera, made of the ingredients set forth.

In testimony of which invention I hereunto set my hand.

JOHN H. MESLER.

Witnesses:
GEO. H. KNIGHT,
JAMES H. LAYMAN.